United States Patent [19]

Shah

[11] Patent Number: 5,304,341
[45] Date of Patent: Apr. 19, 1994

[54] INJECTION MOLDING APPARATUS AND METHOD HAVING IN-CAVITY CONTROL OF PLASTICS AND GAS FLOW RATES

[75] Inventor: Suresh D. Shah, Troy, Mich.

[73] Assignee: General Motors Corporation, Detroit, Mich.

[21] Appl. No.: 990,139

[22] Filed: Dec. 14, 1992

[51] Int. Cl.$^5$ .................. B29C 45/00; B29C 45/03
[52] U.S. Cl. .................. 264/572; 425/130
[58] Field of Search .......... 204/572, 328.7, 328.8; 425/130, 577, 522

[56] References Cited

U.S. PATENT DOCUMENTS

| 5,028,377 | 7/1991 | Hendry | 264/572 |
|---|---|---|---|
| 5,098,637 | 3/1992 | Hendry | 264/572 |
| 5,204,051 | 4/1993 | Jaroschek | 264/572 |
| 5,254,306 | 10/1993 | Inada et al. | 264/572 |

FOREIGN PATENT DOCUMENTS

| 61-53208 | 11/1986 | Japan | 264/572 |
|---|---|---|---|
| 1-168425 | 7/1989 | Japan | 264/572 |
| 3-121820 | 5/1991 | Japan | 264/572 |

OTHER PUBLICATIONS

SAE Technical Paper 910879, Suresh Shah and Dave Hlavaty, "Gas Injection Molding of Thermoplastic Composite Window Guidance Channel", Feb. 25–Mar. 1, 1991.

*Primary Examiner*—Catherine Timm
*Attorney, Agent, or Firm*—George A. Grove

[57] ABSTRACT

A plastics injection molding machine includes an injection mold having a cavity for molding a part with channels of relatively larger and smaller volumes. Plastics material and pressurized gas are injected into the cavity and are forced to flow into the channels. A flow restricting element is selectively extendable into the smaller volume channel to decrease the rate at which the plastics material flows into the smaller volume channel in order to balance the distribution of plastics material and gas among the channels, and develop a part with substantially uniform cross-sectional material wall thickness desired gas penetration length in hollow channels.

11 Claims, 2 Drawing Sheets

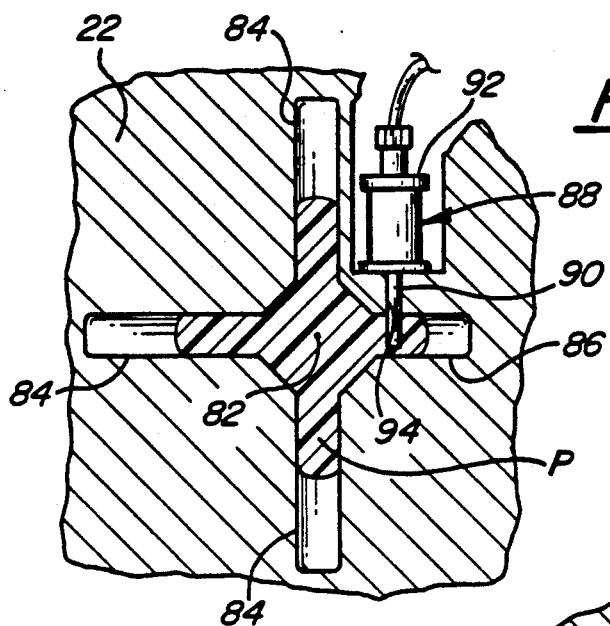
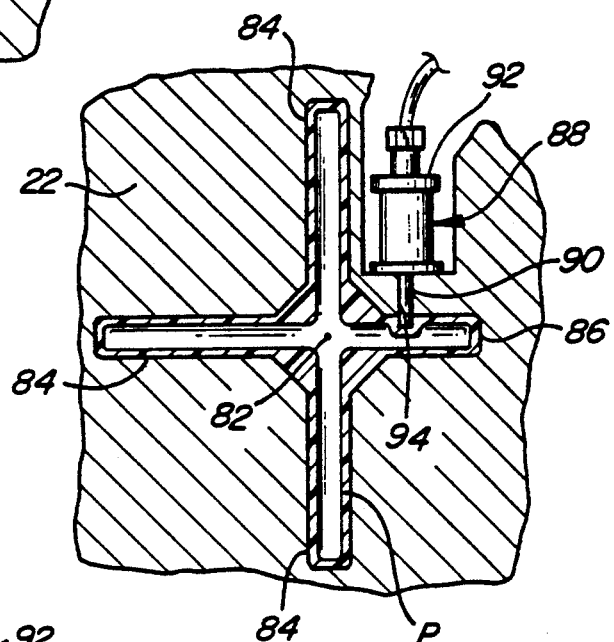
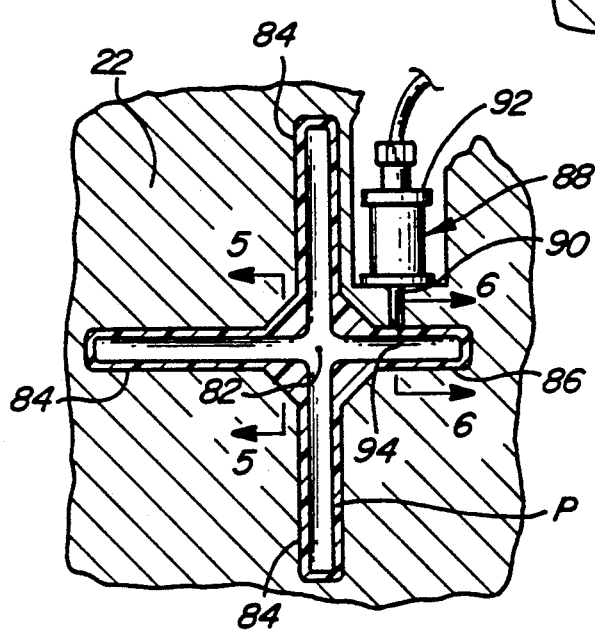

INJECTION MOLDING APPARATUS AND METHOD HAVING IN-CAVITY CONTROL OF PLASTICS AND GAS FLOW RATES

FIELD OF THE INVENTION

This invention relates to injection molding apparatus and methods used to produce hollow plastics articles and more particularly to those provided with means for controlling the flow of injected plastics material and gasses within a mold cavity.

DESCRIPTION OF RELATED PRIOR ART

Various gas-assisted injection molding machines and methods have been employed heretofore to produce hollow molded plastic articles with a variety of geometrical configurations. In general, injection molding involves partially filling a contoured mold cavity with melted plastics material injected into the cavity as a short shot. Pressurized gas is introduced simultaneously and/or subsequently with the plastics melt causing the melt to be forced as a continuous layer against the contoured surface of the cavity to produce the resultant hollowed article.

While known prior art molding machines and methods are generally satisfactory for molding articles having simple geometric configurations, difficulties have been encountered in molding hollow articles of complex configurations, and particularly where the mold cavity includes two or more channels branching from the injection gate having relatively different volumes.

On injection, the plastics material is forced into each of the channels. If the channels have the same cross-sectional and volumetric size, then the material will flow into each of the channels at the same rate. Problems arise, however, in that the smaller volume channel fills with plastics material at a faster rate than the other larger volume channels producing an imbalance in the distribution of plastics material among the channels whereby the smaller volume channels become over-filled with plastics material. The same imbalance occurs on injection of the gas. Consequently, the material in the larger channels of the cavity will develop a uniform cross-sectional wall thickness on gas injection, whereas the material in the smaller channels will develop a thickened wall section at the end of the channels due to the presence of the excess plastics material.

It is presently the practice of this industry to provide "spill-over" reservoirs at the ends of the smaller volume channels to effectively equalize their volume with that of the larger channels. Such practice is described in the prior U.S. Pat. No. 5,098,637 issued Mar. 24, 1992, for PROCESS FOR INJECTION MOLDING AND HOLLOW PLASTIC ARTICLE PRODUCED THEREBY and also discussed in the SAE TECHNICAL PAPER 910879, published on Feb. 25, 1991 and coauthored by Suresh D. Shah, the inventor herein. The spill-over reservoirs permit the excess plastics material that would otherwise collect in the smaller channels to flow into the reservoir so as to prevent formation of the thickened wall sections at the end of the smaller volume channels and produce a part with uniform cross-sectional material wall thickness as a result of complete gas penetration in the hollow channel. For finishing the part, the spill-over material is subsequently severed from the part, or article, after the part is removed from the mold.

SUMMARY OF THE INVENTION

In this invention, an injection molding apparatus used for producing hollow molded articles includes an injection mold having separable parts operably connected to a define a contoured mold cavity therebetween having at least first and second channels. The channels may be of different volume with one being relatively smaller than the other. Material injection means are provided for injecting a given quantity of plastics material into the cavity under pressure causing the material to flow into each of the channels. Also provided are gas injection means for injecting pressurized inert gas, such as nitrogen, into the cavity forcing the plastics material to flow as a continuous layer against the contour of the mold cavity walls.

An important feature of this invention is the provision of flow regulating means within the cavity for regulating the flow of the material introduced into each of the channels for controlling distribution of plastics material among the channels during the plastics injection as well as gas injection and the resultant cross-sectional wall thickness of the material within each of the channels. When the channels of the cavity are of different volume, as described in the prior art section above, the in-cavity flow regulating means of this invention overcomes the problem of over-filling the smaller volume channels by extending a flow restricting element into the smaller volume channels. This element effectively regulates time controlled opening and closing and restricts the flow of material therein so as to equalize the filling rates of the discrete channels and hence balance the distribution of plastics material among the extent of each of the channels in order to develop a part with uniform cross-sectional material wall thickness in the channels.

This invention importantly obviates the need for spill-over reservoirs and hence reduces material waste and handling at a substantial cost savings to the user.

These and other features, objects and advantages of this invention will become more apparent from the following detailed description and drawings in which:

BRIEF DESCRIPTION OF THE DRAWINGS

FIG. 2 is a cross-sectional view taken generally along lines 2—2 of FIG. 1 illustrating a fully extended position of the flow restricting valve during injection of the plastics material;

FIG. 3 is a view like FIG. 2 but showing the flow restricting valve partially extended during injection of the pressurized gas;

FIG. 4 is a fragmentary cross-sectional view like FIG. 3 but with the flow restricting element fully retracted at the end of the gas injection step;

DETAILED DESCRIPTION OF THE DRAWINGS

Figure 1:
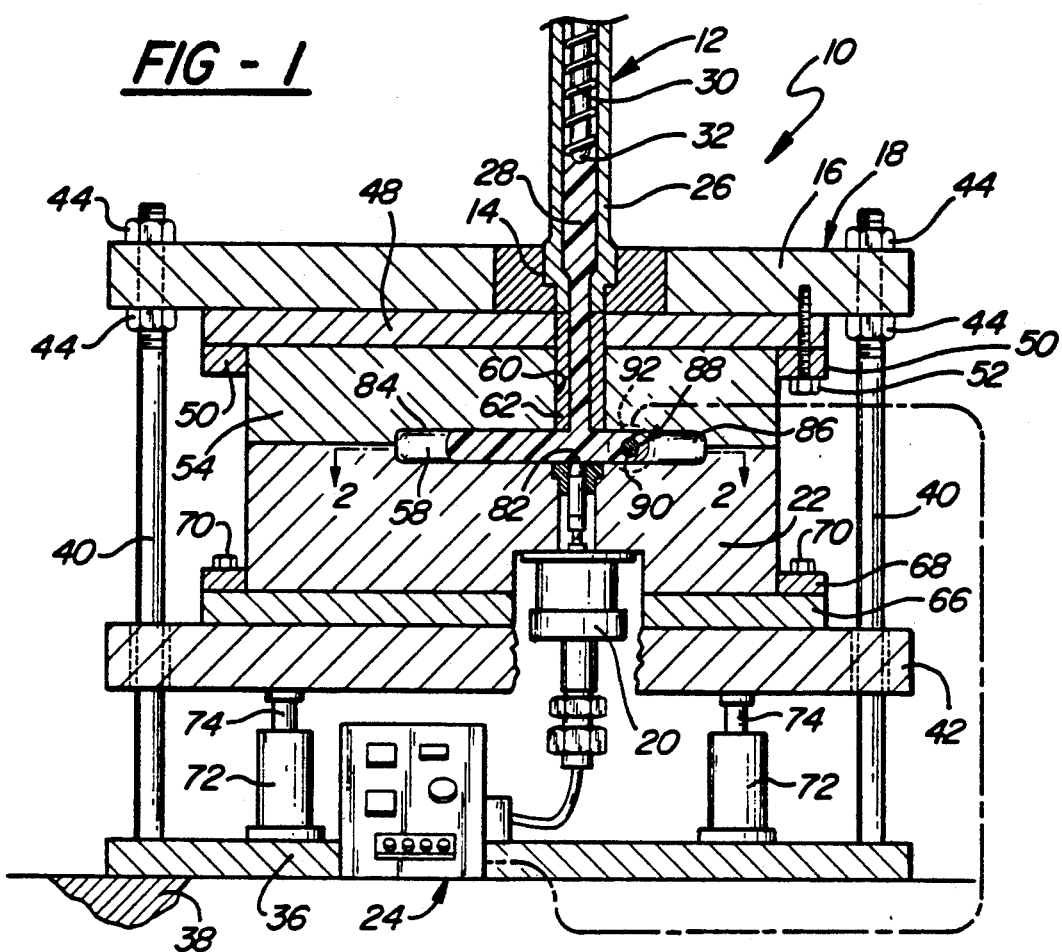
FIG. 1 is diagrammatic view generally in cross-section and partly broken away of an injection molding apparatus constructed according to this invention.

Turning now in greater detail to the drawings, there is shown in FIG. 1 a diagram of an injection molding apparatus 10 comprising a plastics injector unit 12 that may be the same as that disclosed and described in our copending application U.S. Ser. No. 07/935,315, entitled GAS INJECTOR WITH RETRACTABLE NOZZLE FOR ASSIST OF PLASTICS INJECTION MOLDING, filed Aug. 26, 1992, assigned to the assignee of this invention and incorporated herein by reference. The unit 12 has a nozzle end 14 operatively connected to a fixed plate 16 of a mold assembly 18 and a gas injector 20 operatively mounted to a lower molding tool or mold half 22 of the mold assembly 18. Additionally, the molding apparatus includes controls incorporated in a control panel 24 for controlling the operation of the injection molding apparatus 10 including operation of the plastics injector unit 12, the mold assembly 18 and the gas injector 20.

The plastics injector unit 12 is utilized to bring the plastics material P to a viscous state within a predetermined temperature and density range and to homogenize the plastics P into a melt that is injected as a short shot (about 70 to 90% of mold cavity capacity) into the mold assembly 18. This unit 12 includes a cylindrical barrel 26 having a passage therethrough that connects to a melt accumulator chamber 28 and an injector nozzle 14 at the end of the barrel 26. The injector 12 has an elongated screw 30 operatively mounted in the barrel 26 that is heated by surrounding electric heater (not shown). The extended distal end of the screw 30 is provided with a one-way valve 32 which allows the melt P to be fed by the screw 30 into the accumulation chamber 28 but which blocks the return of the melt from the chamber 28 by stroking movement of the screw 30 by an injection piston (not shown) so that a predetermined quantity or "short-shot" of plastics melt P is injected into the mold assembly 18 through a feed passage therein.

The mold assembly 18 comprises a base plate 36 mounted to a support 38 and provided with a plurality of tie rods 40 extending therefrom through bushings in a moveable rectilinear platen 42 and terminating into securement with the fixed platen 16 by threaded fasteners 44. The relatively moveable platens are in alignment with one another and are used to support and open and close the separable mold parts or halves of the mold assembly 18.

Mounted interiorly of the fixed upper platen 16 by means of a retainer plate 48, retainer ring 50, and threaded fastener 52 is an upper molding tool 54 that in cooperation with the mating lower molding tool 22, provides a profiled mold cavity 58 having contoured mold cavity walls. The cavity 58 is connected to the plastics injector 12 through sprue or passage 60 lined with a cylindrical bushing 62 provided in the upper molding tool 54 and retainer plate 48, as illustrated in FIG. 1.

The lower mold tool 22 is mounted on a retainer plate 66 that is in turn secured by a support ring 68 and threaded fasteners 70 to the lower platen 42. The lower platen 42 is movably mounted on the tie rods 40 by the controlled action of hydraulic cylinders 72. These cylinders are supported on the base plate 36 and have moveable pistons (not shown) therein with piston rods 74 operatively connected to platen 42 for moving the platen 42 on the tie rods 40 for opening and closing the mold halves 22,54. The controls of control panel 24 are selectively employed to feed, discharge and monitor pressure oil employed to open and close the mold assembly 18. Accordingly, the mold tooling can be closed and the cavity 58 supplied with a short shot of plastics melt, and after an article has been molded in the cavity 58, moved to an open position so that the molded article can be ejected with conventional ejector pins or other devices associated with the tooling.

The cavity 58 is formed with a plurality of discrete branched portions or channels that are connected by a common central material feeding region 82 into which the plastics material and gasses are introduced and distributed to the channels. To illustrate the principles of this invention, a simplified cavity is shown in the drawings and includes four channels branching off from a central feeding region 82 of the cavity 58 and terminating at distal closed ends. As shown in FIGS. 2-4, three of the channels, indicated at 84, are relatively longer (i.e. extends further from region 82) than a fourth channel indicated at 86. A thin web section 87 may extend between each channel 84, 86 and each web section is equal in size. The channels 84, 86 are equal in cross-section and hence the shorter channel 86 has a relatively smaller volume capacity than the longer channels 84.

Since the cross-sections of the channels 84, 86 are equal, the plastics melt P injected into the feeding region 82 flows into the larger and smaller volume channels 84, 86 at the same rate. However, because the channel 86 has less volume capacity than the larger channels 84, the smaller volume channel 86 will be filled with the plastics material P at a faster rate than the larger volume channels 84. In other words, if the flow rates of material into the channels are the same or nearly equal, but one or more of the channels is of lesser volume, then the lesser volume channels will become filled with the plastics material P at a faster rate (i.e. filled first) than the relatively larger volume channels. If it is required, for example, that each channel be filled to 70% capacity, then there will be a tendency for the smaller volume channel 86 to be overfilled with the plastics P when the larger volume channels 84 are partially filled by the predetermined amount.

When the pressurized gas is injected into the cavity 58 a short time after the plastics melt injection, the pressurized gas expands from the interior of the melt P and forces the plastics material against the cavity walls. The forces from the pressurized gas cause the larger volume channels 84 to develop substantially uniform cross-sectional wall thicknesses due to larger gas penetration length (i.e. void length), and the smaller volume channel 86 to develop a nonuniform wall thickness, particularly with thickened wall sections at the end of channel 86 due to less gas penetration length and the presence of excessive plastics material.

Importantly, this invention provides in-cavity flow regulating means 88 for controlling the flow and distribution of the plastics material P and gas injected into the cavity 58 wherein each of the channels, regardless of their relative volumes, receives the proper distribution of plastics material so as to control the resultant gas penetration and hence wall thickness of the part being formed in each of the channels.

The flow regulating means 88 preferably comprises a flow restricting valve having a flow restricting element 90 which is extendable into the cavity and preferably the smaller volume channel 86 for effectively reducing the cross-sectional passageway or opening into the smaller channel 86 and hence reducing the flow rate of plastics material P entering the smaller channel 86. Decreasing the flow rate produces a corresponding decrease in the material fill rate of the smaller channel 86. Through trial and error, a position of the flow restricting element 90, or closing and opening time of flow restrictor valve, can be determined wherein the fill rates of the smaller and larger channels 86, 84 are balanced or equalized such that each receives the prescribed amount of plastics material P necessary to develop molded articles having uniform cross-sectional material wall thicknesses in each of the channels. The flow restricting element 90 thus may be used to effectively eliminate the problem of over filling the smaller volume cavity 86 enabling gas penetration to the end of channel, and development of a uniform wall thickness within the smaller cavity 86 without need for a spill-over reservoir.

Figure 5:
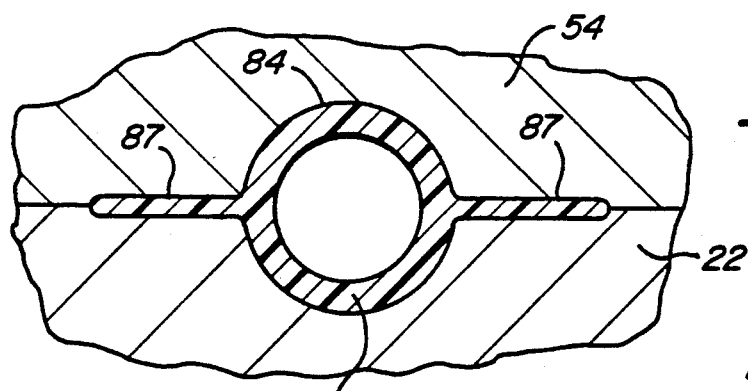
FIG. 5 is a fragmentary cross-sectional view taken along lines 5—5 of FIG. 4.
Figure 6:
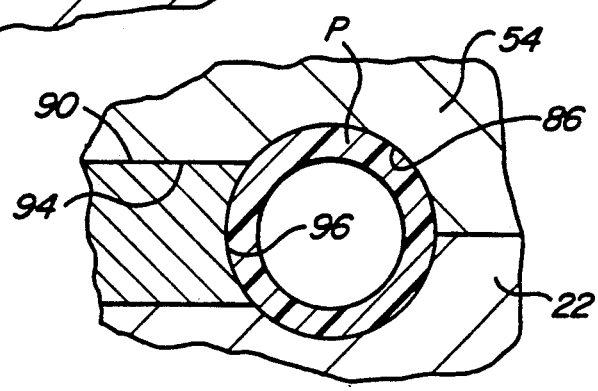
FIG. 6 is an enlarged fragmentary cross-sectional view taken along lines 5—5 of FIG. 4 and illustrating the profiled end face of the flow restricting element.

The flow restricting valve 88 preferably comprises a hydraulic fluid power cylinder 92 mounted to the mold assembly 18 and operative for selectively positioning the flow restricting element or pin 90 in any one of a plurality of extended positions within the smaller volume channel 86 through an opening 94 in the cavity wall. FIG. 2 shows the pin 90 fully extended into the channel 86 as it might be during injection of the plastics material. FIG. 3 shows the pin 90 partially retracted as it might be during at least a portion of the gas injection step. FIG. 4 shows the pin 90 fully retracted from the cavity 58 so that an end face 96 of the pin 90 is flush with the cavity walls and forms a portion of the surface of the mold cavity 58. As shown in FIG. 5, the end face 96 is preferably contoured to conform with the surface shape of the cavity 58 so that when fully retracted the flow restriction pin 90 defines a portion of the cavity walls. The exact position of the pin 90 during the molding cycle will depend on many variables including the cavity configuration, the type of material being molded, the desired material distribution in the cavity and for each application will be determined through experimentation. Also, the times of pin actuation in forward and reverse position will be determined by experimentation.

In operation, the heated engineering plastics material P is injected as a short shot into the cavity 58 under pressure causing the material to flow into each of the channels 84, 86 and web 87 of the cavity 58. The flow restricting valve 88 is time-controlled so that at the appropriate time in the casting cycle the valve 88 is actuated to axially move the flow restricting element 90 to a fully extended position within the smaller volume channel 86 as shown in FIG. 2. In this way, the material fill rate for each cavity 84, 86 is balanced so that each cavity receives the proper distribution of plastics material P (i.e., is partially filled by the designed amount).

A short time after the melt injection, the gas injector 20 injects pressurized gas, such as nitrogen or other inert gas, into the cavity 58. At some point prior to or simultaneously with the injection of the gas, appropriate adjustments to the position of the flow restricting pin 90 may be made in order to maintain the material flow balance between the smaller and larger channels during gas injection, such as to partially or fully retract the pin 90 as shown in FIG. 3. The pressurized gas expands from the interior of the melt and forces the plastics material P to flow as a continuous film or layer against the contoured mold surface wherein the material in each of the channels 84, 86 develops a desired gas penetration length at the end of each channel. Importantly, proper positioning of the flow restricting element 90 during molding avoids over filling the smaller volume channel 86 and hence precludes the formation of the aforementioned thickened cross-sectional wall thickness at the end of the smaller volume channel 86.

During a final stage of the gas injecting step when the plastics material P has been substantially distributed as a uniform continuous layer throughout the channels 84, 86 and while the plastics material P is still flowable, the flow restricting element 90 is fully retracted as in FIGS. 4 and 5 so that the end face 96 of the element 90 is flush with the contours of the cavity walls allowing the plastics material P in the vicinity of the restricting element 90 to flow outwardly against the end face 96 of the retracted element 90 to enable this portion of plastics material P to attain the proper mold contour.

The plastics material P is allowed to set up and cool to a temperature at which the mold tool parts can be open and a resultant hollow molded article ejected from the cavity 58. The article may then be physically tested for uniform wall thickness as well as gas penetration length, and appropriate adjustments made to the positioning of the flow restricting element 90 during subsequent molding cycles to correct anomalies.

While preferred embodiments and methods of the invention have been shown and described, other embodiments will now become apparent to those skilled in the art. Accordingly, the invention is not to be limited to that which is shown and described but by the following claims.

What is claimed is:

1. A method of injection molding hollow plastics articles from plastics material utilizing separable mold tool parts to define a contoured mold cavity therebetween when operatively interfaced with at least first and second channels and with the first channel having a volume greater than the volume of said second channel, said method comprising the steps of:

injecting a short shot of hot and moldable plastics material into the mold cavity under pressure causing the material to flow into and partially fill each of the channels;

injecting pressurized gas into the cavity causing the plastics material to flow as a continuous layer against the contour provided by the cavity walls;

moving a retractable plastics flow restricting element to a selected position within said cavity to partially block the flow of plastics material entering into said second channel during the material and gas injection steps to reduce the flow rate of plastics material entering into the second channel and thereby maintaining a predetermined flow balance of said plastics material between each of the channels so that said plastics material forms a hollow plastics article having a wall having a predetermined thickness range and conforming to said cavity including each of said channels;

cooling the plastics material so that it solidifies to form the molded hollow article;

opening the mold tool parts and removing the hollow article from the mold cavity.

2. The method of claim 1 above, and further positioning the flow restricting element at a station so as to equalize the rate at which the channels are filled with material in order to develop a uniform cross-sectional wall thickness of material in the channels, and desired gas penetration length in each channel.

3. The method of claim 2 above, including the step of fully retracting the element from the cavity during a final stage of the gas injection step so that an end face of the element is flush with and forms a portion of the cavity walls and maintaining the pressure on the plastics material causing it to flow outwardly against the end face of the retracted element.

4. A method of injection molding plastics material utilizing mold tool parts operatively connected to define a contoured mold cavity therein having at least first and second channels of different volume, said method comprising the steps of:
injecting a quantity of melted plastics material into the cavity under pressure causing the material to flow into each of the channels of the cavity;
injecting pressurized gas into the cavity forcing the plastics material to flow as a continuous layer against the contours of the mold cavity walls;
regulating the flow rate of the plastics material and gas into the channels by extending a retractable flow restricting element into the channel of relatively smaller volume to thereby equalize the rate at which each of the channels is filled with the material and develop a generally uniform cross-sectional thickness material layer and desired gas penetration length in each of the channels;
cooling the plastics material to a prescribed removal temperature to produce a resultant hollow molded article;
and opening the mold tool parts and removing the article from the mold cavity.

5. The method of claim 4, including the step of moving the flow restricting element between a fully extended position in the cavity and fully retracted position in which the flow restricting element is withdrawn from the cavity so an end face surface of the element is substantially flush with and forms a portion of the cavity wall, the method being further characterized by a) maintaining the flow restricting element in the fully extended position during the material injection stage; b) thereafter at least partially retracting the flow restricting element during at least a portion of the gas injection step; and c) moving the flow restricting element to the fully retracted position during a final stage of the gas injection step.

6. The method of claim 5, including controlling the position of the flow restricting element as a function of mold cycle time.

7. Apparatus for injection molding plastics material to produce hollow molded articles, said apparatus comprising:
a plastics injection mold having separable mold parts with walls to define a contoured mold cavity therebetween when operatively interfaced, said cavity including at least first and second channels having differing volumes, said channel having the smaller volume having an opening;
material injection means for injecting a quantity of melted plastics material into said channeled cavity under pressure causing material to flow into each of said channels, material flowing into said channel having the smaller volume through said opening;
gas injection means for injecting pressurized gas into said channeled cavity so that said gas penetrates into said plastics material for forcing the plastics material to flow as a continuous layer against the contour of the walls defining said channeled cavity; and
adjustable flow regulating means operatively mounted within or adjacent to the opening into said channel having the smaller volume for metering the flow of plastics material into said channel having the smaller volume thereby regulating the flow of the material introduced into each of said channels for controlling the resultant cross-sectional layer thickness of the material and the length of gas penetration within each of said channels.

8. The apparatus of claim 7, wherein said adjustable flow regulating means includes a flow restricting valve having a valve element which has an outer end surface and which is selectively extendable into said channel having the lesser volume to adjustably restrict the flow of material entering therein and retractable from said last mentioned channel so that the outer end surface of said element is flush with and forms a portion of the wall of said cavity.

9. The apparatus of claim 8, wherein said end face surface of said element is profiled to conform with the contoured shape of the cavity walls.

10. Apparatus for injection molding plastics material to produce hollow molded articles, said apparatus comprising:
a plastics injection mold having separable interfacing tool parts having relieved wall means therein and operative to define a contoured mold cavity therebetween including at least first and second channels having differing volumes;
plastics injector means for injecting a quantity of melted plastics material into said cavity under pressure causing plastics material to flow into each of said channels;
gas injection means for injecting pressurized gas into said cavity forcing the plastics material to flow as a continuous layer against the contour defined by the wall means of said mold cavity; and
flow regulating means operatively mounted on one of said tool parts for regulating the flow of the material introduced into each of said channels for controlling the resultant cross-sectional wall thickness of the material and gas penetration length within each of said channels, said flow regulating means comprising a flow control valve movable to an infinite number of positions into said lesser volume channel through said cavity wall, means for restricting the flow of plastics material into the lesser volume channel to correspondingly decrease the plastics material fill rate of the lesser volume channel causing said plastics material to form a plastics article with hollow portions conforming to said walls of each of said channels.

11. The apparatus of claim 10, wherein said flow regulating means further comprises a hydraulic fluid cylinder for displacing said flow restricting valve element to any one of said infinitely number of positions.

* * * * *